(12) United States Patent
Singh et al.

(10) Patent No.: US 7,740,743 B2
(45) Date of Patent: Jun. 22, 2010

(54) FINE PARTICLE SIZE LIME SLURRIES AND THEIR PRODUCTION

(75) Inventors: Michael Singh, Pudsey (GB); Fritz Herren, Düdingen (CH); Christina Northfleet, Lörrach (DE); Robert Cockcroft, Bradford (GB); Kenneth Symes, Keighley (GB); Simon Donnelly, Michelbach-le-haut (FR); Andrew McCann, Pudsey (GB); Valerie Reynolds, Bradford (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 50 days.

(21) Appl. No.: 11/666,871

(22) PCT Filed: Nov. 4, 2005

(86) PCT No.: PCT/EP2005/011833

§ 371 (c)(1),
(2), (4) Date: May 1, 2007

(87) PCT Pub. No.: WO2006/050865

PCT Pub. Date: May 18, 2006

(65) Prior Publication Data

US 2007/0265407 A1     Nov. 15, 2007

(30) Foreign Application Priority Data

Nov. 15, 2004    (GB) ................................. 0425102.1

(51) Int. Cl.
*D21H 11/00* (2006.01)
*D21H 13/00* (2006.01)
*D21H 15/00* (2006.01)
*D21H 17/00* (2006.01)
*D21H 19/00* (2006.01)
*D21H 21/00* (2006.01)
*D21H 25/00* (2006.01)
*D21H 27/00* (2006.01)
*C08F 26/00* (2006.01)
*C08F 126/00* (2006.01)
*C08F 226/00* (2006.01)

(52) U.S. Cl. .................... 162/174; 162/168.1; 526/312; 526/316; 526/72

(58) Field of Classification Search ................. 526/312, 526/316, 72; 162/168.1, 174
See application file for complete search history.

(56) References Cited

U.S. PATENT DOCUMENTS 3,311,594 A     3/1967    Earle, Jr. ..................... 260/77.5
(Continued)

FOREIGN PATENT DOCUMENTS

CA        758488 A   *   9/1967
(Continued)

OTHER PUBLICATIONS

Proteins: Enzymes, http://www.search.eb.com/eb/article-72579.*
(Continued)

*Primary Examiner*—Mark Eashoo
*Assistant Examiner*—Liam J Heincer
(74) *Attorney, Agent, or Firm*—Tyler A. Stevenson

(57) ABSTRACT

A polymer comprising i) a synthetic polymeric component that has been formed from an ethylenically unsaturated water-soluble or potentially water-soluble monomer and an ethylenically unsaturated monomer carrying a reactive group, wherein the reactive group is directly reactive with a cellulose binding domain protein; and ii) a protein component consisting of a cellulose binding domain protein, wherein the cellulose binding domain protein. The polymer is particularly suitable as a dry strength resin in a paper making process. It can also be used as a wet strength resin, internal sizing agent or surface sizing agent.

8 Claims, 1 Drawing Sheet

| | | | |
|---|---|---|---|
| 3,556,932 A | 1/1971 | Coscia et al. | 162/166 |
| 4,226,938 A * | 10/1980 | Yoshida et al. | 435/176 |
| 4,246,351 A * | 1/1981 | Miyake et al. | 435/182 |
| 4,266,030 A | 5/1981 | Tschang et al. | 435/180 |
| 4,331,784 A * | 5/1982 | Ishibashi et al. | 525/313 |
| 4,388,428 A * | 6/1983 | Kuzma et al. | 523/106 |
| 4,478,976 A * | 10/1984 | Goertz et al. | 525/54.1 |
| 4,511,694 A * | 4/1985 | Kramer et al. | 525/54.1 |
| 4,605,702 A * | 8/1986 | Guerro et al. | 525/154 |
| 4,812,550 A * | 3/1989 | Erickson et al. | 527/201 |
| 4,839,419 A * | 6/1989 | Kraemer et al. | 525/54.1 |
| 5,041,503 A | 8/1991 | Dauplaise et al. | 525/383 |
| 5,104,931 A * | 4/1992 | Fleminger et al. | 525/54.1 |
| 5,308,449 A * | 5/1994 | Fuentes et al. | 162/72 |
| 5,714,560 A * | 2/1998 | Denzinger et al. | 527/201 |
| 5,719,044 A * | 2/1998 | Shoseyov et al. | 435/69.7 |
| 5,783,041 A | 7/1998 | Underwood | 162/164.1 |
| 5,856,201 A * | 1/1999 | Shoseyov et al. | 436/501 |
| 5,874,308 A * | 2/1999 | Kilburn et al. | 435/395 |
| 5,972,872 A * | 10/1999 | Lange et al. | 510/392 |
| 5,989,899 A * | 11/1999 | Bower et al. | 435/263 |
| 6,111,053 A * | 8/2000 | Brahm et al. | 528/75 |
| 6,117,664 A * | 9/2000 | Schulein et al. | 435/209 |
| 6,149,994 A * | 11/2000 | Mueller et al. | 428/35.7 |
| 6,166,149 A * | 12/2000 | Yamaguchi et al. | 525/404 |
| 6,225,462 B1 * | 5/2001 | Berry et al. | 536/123.1 |
| 6,268,196 B1 * | 7/2001 | Fowler et al. | 435/209 |
| 6,465,410 B1 * | 10/2002 | Bettiol et al. | 510/392 |
| 6,635,146 B2 * | 10/2003 | Lonsky et al. | 162/9 |
| 6,818,803 B1 * | 11/2004 | Austin-Phillips et al. | 800/278 |
| 7,125,471 B2 * | 10/2006 | Hill et al. | 162/189 |
| 2003/0113606 A1 * | 6/2003 | Ritts et al. | 429/33 |
| 2003/0113792 A1 * | 6/2003 | Swan et al. | 435/7.1 |
| 2003/0212198 A1 * | 11/2003 | Takao et al. | 524/588 |
| 2004/0091977 A1 * | 5/2004 | Teeri et al. | 435/101 |
| 2004/0241753 A1 * | 12/2004 | Meier et al. | 435/7.1 |
| 2005/0070003 A1 * | 3/2005 | Schulein et al. | 435/209 |
| 2005/0208487 A1 * | 9/2005 | Burmeister et al. | 435/6 |
| 2005/0279469 A1 * | 12/2005 | Saville et al. | 162/72 |
| 2007/0074832 A1 * | 4/2007 | Ampulski | 162/109 |
| 2007/0074833 A1 * | 4/2007 | Ampulski | 162/109 |

FOREIGN PATENT DOCUMENTS

| | | |
|---|---|---|
| EP | 0126528 | 11/1984 |
| EP | 0128661 | 12/1984 |
| EP | 0235893 | 9/1987 |
| GB | 1482515 | 8/1977 |
| GB | 2001083 | 1/1979 |
| GB | 2002400 | 2/1979 |
| WO | 90/07527 | 7/1990 |
| WO | 01/34091 | 5/2001 |

OTHER PUBLICATIONS

Shoseyov et al., Cellulose binding domains-A novel fusion technology for efficient, low cost purification and immobilization of recombinant proteins, Newsletter of Novagen, Inc., No. 7, 1997, pp. 1-3.*
Kitaoka et al., J. Wood Sci., (2001), vol. 47, pp. 322-324.
Chem. Abstr. 2004:222096.
English Language Abstract for JP 2002226511, Aug. 14, 2002.

* cited by examiner

FINE PARTICLE SIZE LIME SLURRIES AND THEIR PRODUCTION

The present invention relates to polymeric compositions that comprise a synthetic polymeric component and a cellulose binding domain (CBD) protein. The compositions are particularly suitable as dry strength additives and enable paper to be manufactured with improved strength. The compositions are also suitable as wet strength additives, internal sizing agents and surface sizing agents.

It is known that the paper strength characteristics tend to depend on the strength of individual cellulosic fibres and the ability to form strong bonds between cellulosic fibres and also the network of cellulosic fibres forming the cellulosic sheet. Poor quality cellulosic fibres can result in diminished strength characteristics. Furthermore, a non uniform distribution of cellulosic fibres that results in poor formation will also compromise strength of the cellulosic sheet that is formed.

It is known to add polymeric additives to improve both the wet strength characteristics during papermaking and the dry strength characteristics of the paper thus formed. Typically, such polymeric additives that are commercially available include natural, partially modified, or synthetic water-soluble polymers, such as cationic starches, anionic starches, sodium carboxymethyl cellulose, polyacrylamides, anionic polyacrylamides and low molecular weight cationic polymers such as PolyDADMAC (diallyl dimethyl ammonium chloride), polyamide amine epichlorohydrin, polyamine epichlorohydrin, polydicyandiamide.

U.S. Pat. No. 3,311,594, discloses the preparation of Aminopolyamide-epichlorohydrin APAE wet strength resins. The resins are prepared by reacting epichlorohydrin with aminopolyamides, and the APAE resins can exhibit storage problems in concentrated form and gel during storage, although generally to a lesser extent than the GPA resins. For this reason it has been common practice to dilute the APAE resins to low solids levels to minimize gelation. The APAE resins impart dry and wet strength to paper.

Glyoxylated polyacrylamide-diallyldimethyl ammonium chloride copolymer resins are known for use as dry strength and temporary wet strength resins for paper. U.S. Pat. No. 4,605,702 teaches the preparation of a wet strength additive by glyoxalating an acrylamide copolymer having a molecular weight from about 500 to 6000. The resulting resins have limited stability in aqueous solution and gel after short storage periods even at non-elevated temperatures. Accordingly, the resins are typically supplied in the form of relatively dilute aqueous solutions containing only about 5-10 wt % resin.

U.S. Pat. No. 5,783,041 describes a method for improving the dry strength characteristics of paper by adding to a pulp slurry during a paper-making process a mixed resin solution containing an aminopolyamide-epichlorohydrin resin, a glyoxylated acrylamide-diallyidimethyl ammonium chloride resin, and a high charge density cationic resin.

U.S. Pat. No. 3,556,932 describes water-soluble, glyoxalated, acrylamide polymer wet strength agents. These wet-strength agents are made from polymers with molecular weights ranging from less than about 1,000,000, although preferance is given to molecular weights less than about 25,000. The polymers are reacted with glyoxal in a dilute, aqueous solution to impart —CONHCHOHCHO functionalities onto the polymer and to increase the molecular weight of the polymer through glyoxal cross-links. Low molecular weight polymers and dilute solutions are required to impart at least a 6% —CONHCHOHCHO functionality to the polymers without infinitely cross-linking, or gelling, them, in which condition the polymers are useless for wet-strength applications. Even at these low solids concentrations (dilute conditions), cross-linking continues and limits the shelf life of the product. For example, commercial products, supplied as 10% solid solutions, gel within about 8 days at room temperature.

U.S. Pat. No. 5,041,503 attempts to overcome the disadvantages of glyoxylated polyacrylamides by producing them as microemulsions. The polymer molecules are said to be kept separate in the microemulsions thereby preventing cross-linking and thus enabling higher molecular weight polymers to be used. The polymers are said to be capable of providing improved or wet and dry strength in papermaking even when the polymers are cross-linked.

It is known to prepare polymeric compositions comprising a synthetic polymer components and proteins for a variety of applications, for instance as water swellable polymers in biomedical applications. For instance WO 90/07527 describes preparing cross-linked hydrogels for biomedical applications prepared from polymerizable compositions comprising fluorine containing monomers and reactive ester groups capable of coupling with amino containing compounds by the formation of an amide link with a protein. This reference does not concern the preparation of a composition comprising a cellulose binding domain protein and nor is it relevant to the objective of the improvement of the strength of paper.

In recent years there has been a trend towards recycling the process water used in papermaking processes, such that a high proportion of the white water is returned into the process to minimise the environmental impact in polluting watercourses and also the demand on fresh mains water introduced into the papermaking process. Recycling of process water tends to result in a buildup of ionic substances, such as anionic trash including lignosulphonates. Consequently the levels of ionic substances contained in the process water tends to be much higher in closed systems. Conventional ionic dry and wet strength resins employing electrostatic attraction as a means to bind to cellulose have been found to be less effective in closed loop systems.

Although non-ionic conventional dry and wet strength resins do not tend to be adversely affected by the high electrolytic contents of closed loop papermaking systems, such conventional additives tend not to be as effective as the ionic additives, employed in papermaking systems in which there is less recycling of the process water.

WO-A-01/34091 describes the cross-linking of polysaccharides using a polysaccharide binding domain fusion protein. The cellulose binding domain fusion proteins are specifically described. Cellulose containing materials such as paper and textiles exhibiting increased wet strengths and/or elasticity are described.

An article by Takuya Kitaoka et al, entitled "Novel paper strength additives containing cellulose binding domain of cellulase", J Wood Sci (2001) 47: 322-324 describes covalently bonding cellulose binding domain proteins to anionic polyelectrolytes which are modified so that they are reactive towards the protein. The anionic polyelectrolytes contain carboxylic groups which are not directly reactive with the protein and reacted with a carbodiimide hydrochloride compound. The post treated reaction product was then combined with the cellulose binding domain protein to produce a synthetic polymer covalently bonded to the protein. The reaction product was found to be less effective as a dry or wet strength additive than conventional dry and wet strength additives.

Chemical Abstracts reference (accession number 2004: 222096) describes a similar disclosure to the Journal of Wood Science (2001) 47: 322-324.

JP-A-2002 226511 (Takuya Kitaoka et al) describes self fixing polymer additives having cellulose absorption ability given by introducing an absorption ability expression and domain or a functional group specifically binding to a molecular chain of cellulose in a macromolecular compound.

It is an objective to provide dry and wet strength additives that are more effective than the aforementioned products described in the prior art. It is a further objective to provide a product that can be useful as an internal or surface sizing agent in papermaking processes.

Furthermore, it is a objective of the present invention to provide a composition comprising synthetic polymeric component and cellulose binding domain protein that can be produced more conveniently and also without the risk of forming by products.

Figure 1:
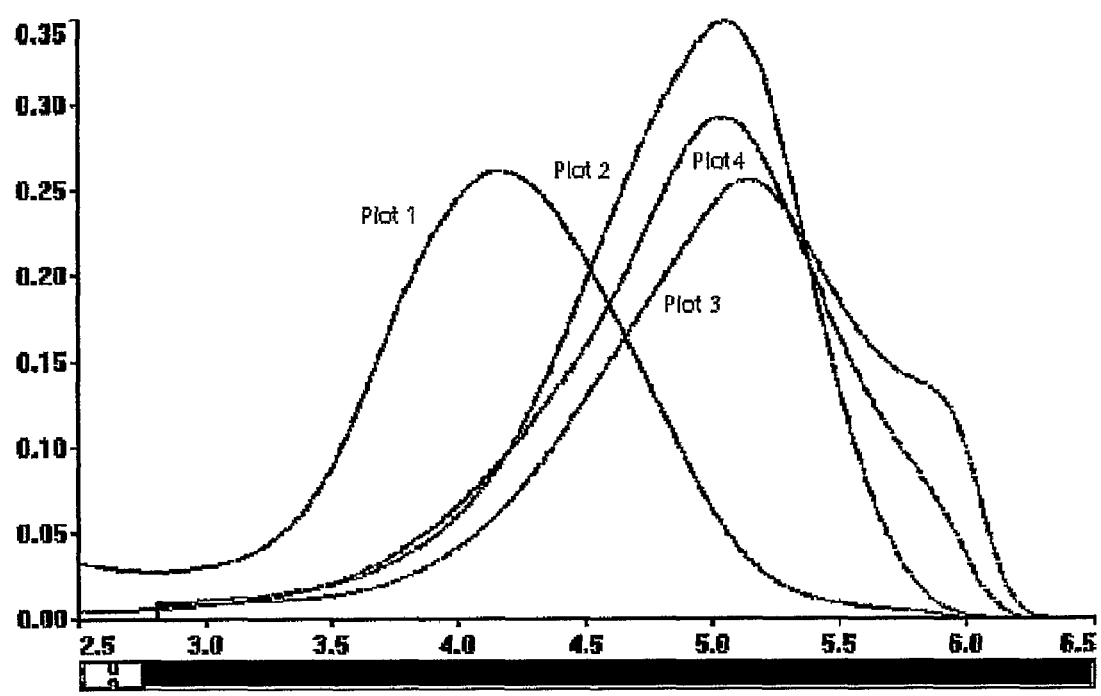
FIG. 1 shows the molecular weight distribution of the unreacted CBD (plot 1), the unreacted polymer (plot 2), and the CBD-polymer post reacted material (plot 3) as analysed using the 210 nm UV detector. This plot also shows the CBD-polymer post reacted material (plot 4) using a 280 nm UV detector system.

According to the present invention we provide a polymer comprising
i) a synthetic polymeric component that has been formed from an ethylenically unsaturated water-soluble or potentially water-soluble monomer and an ethylenically unsaturated monomer carrying a reactive group wherein the reactive group is directly reactive with a cellulose binding domain protein; and
ii) a protein component comprising a cellulose binding domain protein.

In accordance with the present invention we also provide a mixture comprising the aforementioned synthetic polymeric component and the aforementioned protein component comprising a cellulose binding domain protein. Thus in the mixture the two components may exist in an essentially unreacted state.

The mixture may be subjected to reaction conditions in which the two components become associated and thereby providing the polymer of the invention. This association could be an ionic association but preferably will be a covalent bond.

The polymer of the invention may comprise a protein component which is covalently bonded to at least one or more synthetic polymeric components. It may be desirable that a single protein moiety is bonded to two or more synthetic polymer molecules. In some instances a protein molecule may be bonded to several synthetic polymer chains, for instance five or six or even up to ten or more polymer chains.

Alternatively the synthetic polymer component could be bonded covalently to at least two protein components. In this form a single polymer chain may be bonded to a multiplicity of protein components, for instance five or six and may be up to ten or more.

In a further form at least two synthetic polymer components may be covalently bonded to at least two protein components. It may be desirable for several synthetic polymeric chains to be bonded to several protein moieties. Therefore the polymer may exist as a branched on network structure.

The ratio of synthetic polymeric component to the cellulose binding domain protein will generally be in the range of 1:10 to 10:1 on a molar basis, preferably 4:1.

The ethylenically unsaturated monomer containing the reactive group may be any suitable monomer that will copolymerise with the water-soluble or potentially water-soluble monomer. The reactive group may be any suitable reactive group provided that it is directly reactive with a cellulose binding domain protein. By directly reactive we mean that under suitable reaction conditions the reactive group will be reactive directly with at least one group on the cellulose binding domain protein and that it is unnecessary to chemically modify the group in order to render it reactive towards the cellulose binding domain protein. Particularly suitable reactive groups include epoxides, isocyanates, amido methylol groups. Particularly suitable monomers which carries the reactive group include glycidyl acrylate, glycidyl methacrylate, allyl glycidyl ether, N-methyolacrylamide and 3-isopropenyl dimethyl benzyl isocyanate. Especially preferred amongst these are glycidyl acrylate and glycidyl methacrylate.

The ethylenically unsaturated monomer can be prepared synthetically from a suitable starting material and using synthetic catalysts or alternatively by biocatalytically converting a suitable substrate that is capable of being converted into the ethylenically unsaturated monomer. Typically the substrate is brought into contact with a biocatalyst and thereby converting the substrate into the ethylenically unsaturated monomer containing the cellular material and optionally components of a fermentation. Alternatively the ethylenically unsaturated monomer can be produced as a product of the fermentation process.

The cellulose binding domain protein may for instance be any of the CBD's described in WO-A-01/34019. Suitably cellulosic binding domain protein may be obtainable from any of Clostridium cellulovorans. Cellulomonas fimi. Trichoderma reesei or M. Bispora. Particularly preferred are cellulosic binding domain proteins obtained from Clostridium cellulovorans. The cellulosic binding domain protein may be aggregates formed by intermolecular hydrophobic interactions of exposed hydrophobic patches of the cellulose binding domain protein or alternatively it may be in nonaggregated forms.

The water-soluble ethylenically unsaturated monomer desirably has a solubility in water of at least 5 g monomer per 100 mls of water at 25° C. When the monomer is potentially water-soluble it can be modified, for instance after polymerization, to provide a monomer unit that would have been soluble in water, for instance having the above defined solubility.

Suitable water-soluble or potentially water-soluble monomers are selected from the group consisting of acrylamide, methacrylamide, N-alkylacrylamides, hydroxy alkyl (meth) acrylates (e.g. hydroxyethyl acrylate), N-vinylpyrrolidone, vinyl acetate, vinyl acetamide, acrylic acid (or salts thereof), methacrylic acid (or salts thereof), itaconic acid (or salts thereof), crotonic acid (or salts), 2-acrylamido-2-methyl propane sulfonic acid (or salts thereof), (meth) allyl sulfonic acid (or salts thereof), vinyl sulfonic acid (or salts thereof). dialkyl amino alkyl (meth) acrylates or quaternary ammonium or acid addition salts thereof, dialkyl amino alkyl (meth) acrylamides or quaternary ammonium and acid addition salts thereof and diallyl dialkyl ammonium halide (e.g. diallyl dimethyl ammonium chloride). Preferred cationic monomers include the methyl chloride quaternary ammonium salts of dimethylamino ethyl acrylate and dimethyl aminoethyl methacrylate.

Desirably the synthetic polymeric component is formed from a monomer blend comprising water-soluble or potentially water-soluble ethylenically unsaturated monomer and up to 10 mole % of an ethylenically unsaturated monomer carrying a reactive group (as defined previously). The preferred amount of monomer containing the reactive group is generally up to 5 mole %. Usually the reactive group containing monomer will be present in an amount of at least 0.0001 mole %, preferably at least 0.001 mole %. The synthetic polymeric component may be formed entirely of the monomer containing the reactive group and the water-soluble or potentially water-soluble monomer. Typically the water-soluble or potentially water-soluble monomer may be present in amount of up to 99.9999 mole %, preferably up to 99.999 mole %.

It may be desirable to include other ethylenically unsaturated monomers, for instance acrylic esters such as methyl acrylate, methyl methacrylate, ethyl acrylate, ethyl methacrylate, propyl acrylate, propyl methacrylate, n-butyl acrylate, n-butyl methacrylate, iso butyl acrylate, iso butyl methacrylate, n-hexyl acrylate, n-hexyl methacrylate, 2-ethylhexyl acrylate, 2-ethylhexyl methacrylate, stearyl acrylate and stearyl methacrylate; styrene; halogenated monomers such as vinyl chloride and vinylidene chloride. The amount of other monomer will typically be up to 50 mole % although usually will be up to 20 mole %, and more desirably will be less than 10 mole %.

More preferably the synthetic polymeric component is formed from a monomer blend comprising 50 to 99.995 mole % water-soluble or potentially water-soluble ethylenically unsaturated monomer; 0.005 to 2 mole % ethylenically unsaturated monomer carrying a reactive group; and 0 to 50 mole % other ethylenically unsaturated monomer. More preferably still the amount of water-soluble or potentially water-soluble monomer will be between 80 (especially above 90) and 99.995 mole % and the amount of other ethylenically unsaturated monomer (if included) will be up to 20 mole % (especially below 10 mole %).

A particularly preferred synthetic polymeric component is formed from a monomer blend comprising acrylamide and glycidyl methacrylate. Especially preferred is the polymer in which the amount of glycidyl methacrylate is as defined previously for the reactive group containing monomer. A particularly preferred polymer will contain between 0.005 and 5 mole % glycidyl methacrylate the remainder being acrylamide.

The synthetic polymeric component of the invention may have a weight average molecular weight as low as a few thousand, for instance 6000 or 7000 or may be very high, for instance several tens of millions. However, we have found that when the polymer of the invention is for use as a dry strength additive in a paper making process it is preferred that the synthetic polymeric component has a weight average molecular weight of below one million. More preferably the weight average molecular weight will be below 500,000, especially within the range 50,000 to 200,000, in particular between 100,000 and 150,000.

It may be desirable to provide the polymer of the present invention, comprising cellulose binding domain protein and synthetic polymeric component, in the form of an aqueous solution, but alternatively it may be taken a desirable to provide the polymer in the form of a solid particulate material. The solid particular material may be in the form of a powder but preferably it is in the form of beads. It is often desired that the powder or beads are substantially dry and have a size of at least 30 microns, often at least 100 microns, for instance up to 500 microns or up to 1 mm or even 2 mm or larger.

We also provide a method of preparing the polymer of the invention by combining a cellulose binding domain protein and a synthetic polymeric component that has been formed of water-soluble or potentially water-soluble unsaturated monomer and an ethylenically unsaturated monomer that contains a reactive group, which is directly reactive towards the cellulose binding domain protein. The two components are then subjected to reaction conditions for a sufficient period of time to enable the polymer of the invention to be formed.

In one aspect of the invention we provide a method of preparing a polymer comprising a synthetic polymeric component and a protein component comprising a cellulose binding domain protein in which the cellulose binding domain protein has been covalently bonded to the synthetic polymeric component through one or more reactive groups present on the synthetic polymeric component comprising;

a) providing a solution of a synthetic polymeric component that has been formed from an ethylenically unsaturated water-soluble or potentially water-soluble monomer and an ethylenically unsaturated monomer carrying a reactive group, wherein the reactive group is directly reactive with a cellulose binding domain protein b) forming a solution of the cellulose binding domain protein;

c) combining the synthetic polymeric component of step (a) with a solution of the cellulose binding domain protein of step (b) to form a reaction mixture; and d) subjecting the reaction mixture to reaction conditions for sufficient time to allow the cellulose binding domain protein to become associated with the synthetic polymeric component.

In a further aspect of the invention we provide method of preparing a polymer comprising a synthetic polymeric component and a protein component comprising a cellulose binding domain protein in which the cellulose binding domain protein has been covalently bonded to the synthetic polymeric component through one or more reactive groups present on the synthetic polymeric component comprising;

i) forming a monomer blend comprising a water-soluble or potentially water-soluble ethylenically unsaturated monomer and an ethylenically unsaturated monomer carrying a reactive group, wherein the reactive group is directly reactive with a cellulose binding domain protein;

ii) subjecting the monomer blend to polymerisation conditions selected from introducing polymerisation initiators into the monomer blend and/or subjecting the monomer blend to irradiation and/or heating the monomer blend, allowing sufficient time for polymerisation to occur and thereby forming the synthetic polymeric component;

iii) forming a solution of the cellulose binding domain protein;

iv) combining the synthetic polymeric component formed in step (ii) with a solution of the cellulose binding domain protein of step (iii) to form a reaction mixture; and v) subjecting the reaction mixture to reaction conditions for sufficient time to allow the cellulose binding domain protein to become associated with the synthetic polymeric component.

In both of the methods the association of the cellulose domain binding domain protein and the synthetic polymeric component may be ionic but preferably is a covalent bond. Any of the aforementioned preferred features also apply to either of the methods described herein.

The synthetic polymeric component may be formed by combining the aforementioned monomers to form a monomer blend and then subjecting this monomer blend to polymerisation conditions. Typically this may include introducing polymerisation initiators and/or subjecting the monomer blend to actinic radiation, such as ultraviolet light and/or heating the monomer blend. Preferably the monomer blend is dissolved or dispersed in an aqueous medium and water-soluble initiators are introduced into the aqueous medium in order to effect polymerization. It would be possible to effect polymerization using a variety of conventional initiator systems. For instance it is common practice to polymerise water soluble monomers using redox initiator couples, in which radicals are generated by admixing with the monomer a redox couple which is a reducing agent and an oxidising agent. It is also conventional practice to use either alone or in combination with other initiator systems a thermal initiator, which would include any suitable initiator compound that releases radicals at an elevated temperature. Other initiator systems include photo and radiation induced initiator systems, which require exposure to radiation to release radicals thereby effecting polymerisation. Other initiator systems are well known and well documented in the literature.

Typically redox initiators include a reducing agent such as sodium sulphite, sulphur dioxide and an oxidising compound such as ammonium persulphate or a suitable peroxy compound, such as tertiary butyl hydroperoxide etc. Redox initiation may employ up to 10,000 ppm (based on weight of monomer) of each component of the redox couple. Preferably though each component of the redox couple is often less than 1000 ppm, typically in the range 1 to 100 ppm, normally in the range 4 to 50 ppm. The ratio of reducing agent to oxidizing agent may be from 10:1 to 1:10, preferably in the range 5:1 to 1:5, more preferably 2:1 to 1:2, for instance around 1:1.

Polymerisation may also be effected by employing a thermal initiatior alone or in combination with other initiator systems, for instance redox initiators. Thermal initiators would include any suitable initiator compound that releases radicals at an elevated temperature, for instance azo compounds, such as azobisisobutyronitrile (AZDN), 4,4'-azobis-(4-cyanovalereic acid) (ACVA). Typically thermal initiators are used in an amount of up 10,000 ppm, based on weight of monomer. In most cases, however, thermal initiators are used in the range 100 to 5,000 ppm preferably 200 to 2,000 ppm, usually around 1,000 ppm.

The reaction of the cellulose binding domain protein with the synthetic polymeric component is desirably achieved by raising the temperature of the mixture for a suitable period of time. Suitably, the reaction mixture is subjected to a temperature of between 20 and 70° C. for a period of at least 20 minutes. The reaction may proceed over a number of hours, for instance up to three hours that usually will not exceed two hours. Preferably the reaction temperature should be held at between 50 and 70° C., particularly around 60° C., for at least 30 minutes and usually up to 90 minutes.

The reaction product of the cellulose binding domain protein and the synthetic polymeric component may be provided and used as an aqueous liquid containing the reaction product dissolved therein. Alternatively, it may be desirable to provide the reaction product as a particulate dry product. This may be achieved by, for instance forming a thin film and allowing the water evaporate, followed by pulverizing or comminuting the thin film to form a powdered product. It may be desirable to elevate the temperature in order to assist the evaporation of the water.

In one preferred form, the reaction product of the cellulose binding domain protein and the synthetic polymeric component is prepared in bead form. This can be achieved by suspending an aqueous solution of the reaction product in a water immiscible liquid, such that the aqueous reaction product exists as droplets dispersed in the water immiscible liquid, and then dehydrating the aqueous reaction product droplets to form substantially dry beads of the reaction product. Alternatively, the reaction mixture containing the unreacted cellulose binding domain protein and synthetic polymeric component may be dispersed directly into a water immiscible liquid and subjected to reaction conditions followed by dehydration as above. Dehydration may be assisted by using an elevate temperature, for instance between 20 or 30 and 70 or 80° C. It may also be desirable to dehydrate the dispersed reaction product by subjecting the dispersion to reduce pressure or vacuum. This is frequently referred to as azeotropic dehydration. Desirably one or more surfactants and/or dispersion stabilisers may be introduced into the water immiscible liquid.

The size of the substantially dry particles is dictated by the size of the dispersed aqueous phase particles in the immiscible liquid. It is often desired that the dry particles are beads that have a size of at least 30 microns, often at least 100 microns, for instance up to 500 microns or up to 1 mm or even 2 mm or larger. With particles of this size, the substantially dry particles will be separated from the water immiscible liquid by filtration, centrifugation or other conventional separation methods and may be subjected to further drying after the separation. This further drying may be by solvent exchange but is preferably by warm air, for instance in a fluidised bed.

The beads should be dried sufficiently that they are non-sticky and are generally dried to a moisture content that is in equilibrium with the environment or is drier than this.

The polymeric stabiliser is generally an amphipathic stabiliser, for instance, formed from hydrophilic and hydrophobic acrylic monomers. Suitable surfactants, non-aqueous liquids and polymeric stabilisers, and suitable azeotroping conditions, are described in, for instance, EP-A-128661 and EP-A-126528. The stabilisers described in GB-A-2,002,400 or, preferably, GB-A-2,001,083 or GB-A-1,482,515 are particularly preferred.

The immiscible liquid is non-aqueous and desirably includes liquid that can form an azeotrope with water. Often the water immiscible liquid is a blend of a relatively high boiling liquid that remains in the dispersion and a low boiling liquid that is azeotroped from the dispersion. The temperature at which azeotroping occurs is generally below 100° C. and is controlled by the choice of liquid and, especially, the pressure at which the distillation is conducted. Generally the distillation is conducted under reduced pressure and in some cases, in order to avoid possible damage to the protein component, it is preferably that the azeotroping (dehydration under reduced pressure) occurs at a maximum temperature of not more than 80° C., often below 70° C. and most preferably below 50° C. For instance by applying a relatively high vacuum it is possible to azeotropic at very low temperatures, for instance as low as 20 or 30° C. Sodium sulphate or other salt may be added to low at the azeotroping temperature.

It may be desirable to react the cellulose binding domain protein in an aggregated form. Usually at least one synthetic polymer chain will become bonded to each cellulose binding domain component of the aggregated protein. The aggregated cellulose binding domain protein component of the reaction product can then be converted into the non aggregated form whilst covalently bonded to the synthetic polymeric component. This can provide the advantage that the synthetic polymer becomes bonded to the protein remotely from the cellulose binding site. This may create a product which has improved binding capacity to cellulosic fibres.

Alternatively, it may be desirable to react the cellulose binding domain protein whilst in a non aggregated form with the synthetic polymeric component followed by converting the cellulose binding domain protein component into the aggregated form. Such aggregation of the reaction product may be advantageous because it could bring about structuring of the polymer, which for certain applications may be desirable.

The polymer of the present invention is particularly suitable as a dry strength resin in a papermaking process. We have found that by incorporating the polymer comprising the cellulose binding domain protein and the synthetic polymeric component that significant improvements in the tensile strength of the dry paper sheet can be achieved.

We also provide a method of improving the strength of paper produced in a paper making process which process comprises providing a cellulosic suspension comprising cellulosic fibres and optionally fillers, including a dry strength resin, and then dewatering the cellulosic suspension on a wire or mesh to form a sheet and drying the sheet, in which the dry strength resin is a polymer comprising i) a synthetic polymeric component that has been formed from an ethylenically unsaturated water-soluble or potentially water-soluble monomer and an ethylenically unsaturated monomer carrying a reactive group, wherein the reactive group is directly reactive with a cellulose binding domain protein; and ii) a protein component comprising a cellulose binding domain protein, wherein the cellulose binding domain protein is covalently bonded to the synthetic polymer component through one or more of the reactive groups.

Any of the aforementioned preferred features pertaining to the polymer of the invention may be incorporated into this method. The polymer when used for improving the dry strength of paper is desirably included into the wet end of the papermaking process. Typically the polymeric dry strength additive may be included with any other stock components, for instance cellulosic feedstock. It may be included in the mixing chest or the blend chest of the papermaking process or into the thick stock prior to dilution. Alternatively the dry strength resin additive is added into the thin stock. This may be immediately after dilution of the thick stock or possibly after one of the fan pumps. The additive may be included after the centri screen but before draining although preferably it will be added before the centri screen.

The dry strength resin polymer may be added in a conventional amount, for instance at least 300 grams per tonne and possibly as much as 2 kg per tonne or more. Typical doses can be around 1 kg per tonne.

The polymer of the invention may be supplied as and used as an aqueous solution. In one form the polymer may be provided as a relatively concentrated aqueous solution, for instance having a concentration of above 2% by weight, for instance at least 5 or 10% by weight. The aqueous polymer solution may be used directly or instead it may be diluted to a relatively dilute concentration before use, for instance up 1% by weight or less, for instance between 0.05 and 0.5%, such as 0.1% by weight. The polymer product can be in particulate form, for instance as a powder but preferably as a bead. The particulate polymer may be dissolved into water to form an aqueous solution having a concentration for instance as described above. In one further form, it may be desirable to use the particulate polymer directly in the process as a dry strength resin. Preferably the particulate polymer would be in the form of beads which are introduced into the process directly.

Typically drainage and retention aids can also be included in the process together with other additive is, for instance fixatives etc. A typical drainage and retention system may be a microparticle system such as the successful Ciba Hydrocol® process, which is described in EP-A-235893.

The polymer of the present invention which incorporates cellulose binding domain protein and a synthetic polymeric component may also be used as a wet strength resin during the papermaking process. The characteristics of the polymer will be chosen such that it has the capability to cross-link with itself and/or with the cellulose of the cellulosic fibres contained in the stock. We have found that polymer is containing residual reactive groups, particularly glycidyl groups can fulfil this requirement. During the papermaking process, once the cellulosic sheet is formed on the wire or mesh it is usually transferred to machinery which compress and dry the cellulosic sheet. The wet cellulosic sheet is usually transferred to a series of belts, such as the felts, on rollers. The wet cellulosic sheet needs to be sufficiently strong that it will not tear and remains intact during its processing, Significant improvements in wet strength can be observed by incorporating the polymeric additive into the papermaking process. When used as a wet strength additive the polymer can be incorporated in a similar manner as it would be for use as a dry strength additive.

In a further aspect of the invention of polymer that incorporates both cellulosic binding domain protein and synthetic polymeric component can be used as an internal sizing agent. Generally the characteristics of the polymer can be chosen such that when it is included in the papermaking process it modifies the water absorbing properties of the component fibres in the body of the sheet of paper that is formed such that they are less water absorbent. This is important since it prevents unacceptable levels of moisture and water from being absorbed by the paper sheet.

When used as an internal sizing agent that polymer is usually incorporated into the thin stock but this can also be into the thick stock or any of the stock components. It may be desirable to include the polymer in a sizing formulation. Such a formulation may be cationic in nature in order to make it more substantive to the fibres. It may also be desirable that the polymer is cationic and this may be achieved by producing a cationic synthetic polymeric component in which the water-soluble monomer component includes a cationic monomer.

The polymer of the present invention when introduced into the cellulosic suspension of the papermaking process may function substantially simultaneously as a dry strength additive, a wet strength additive and also as an internal sizing agent.

In a further aspect of the invention the polymer including cellulosic binding domain protein and synthetic polymeric component may be used as an surface sizing agent. Generally this is achieved by applying the polymer to the surface of the cellulosic sheet. Preferably, the polymer when used as a surface sizing agent is applied to the surface of the cellulosic sheet during or prior to drying. The surface sizing of a paper sheet ensures that the surface of the paper is rendered less water absorbent. Significant improvements in producing surface sized paper can be achieved using the polymer of the invention.

The surface sizing agent may be applied to the cellulosic sheet in conventional amounts. Typically this would be at least 50 grams per tonne of dry paper and maybe as much as 2 kg per tonne of dry paper, particularly within the range of between 300 grams per tonne and 1.5 kg per tonne.

The following exemplification illustrates the invention.

EXAMPLES

1. Analytical Method

Cellulose binding domain protein (obtained from Clostridium cellulovorans) (identified as CBD), the base polymers and CBD-polymer adducts are analysed by size exclusion chromatography (SEC) using TSK PWXL columns (G6000+G3000+guard) or equivalents. The mobile phase is 0.2 molar sodium chloride (NaCl) with 0.05 molar dipotassium hydrogen phosphate ($K_2HPO_4$) in purified water that is pumped through the system at a nominal flow rate of 0.5 ml/min.

Some amino acids within CBD have aromatic groups and ultra-violet detection (UV) at 280 nm is used to detect these groups. By connecting a UV detector to the SEC system and monitoring at 280 nm the distribution of these aromatic groups, within CBD or within CBD-polymer adducts are determined.

The base polymers have little UV activity at 280 nm but absorb strongly at 210 nm due to the carbonyl chromophore. Molecular weight values and molecular weight distributions of the base polymers and CBD-polymer adducts are determined by detection at 210 nm by calibration of the columns with a set of sodium polyacrylate standards with known molecular weight characteristics. The retention time of each standard in the SEC system is measured and a plot is made of the logarithm of the peak molecular weight versus the retention time.

2. Polymer Synthesis

General Method

1. Into a suitable reaction vessel place water, and diethylenetriaminepentaacetic acid, penta sodium salt (DETAPA)
2. Raise the temperature of the contents and maintain at 80° C.
3. Add initiator (1) to reaction vessel
4. Introduce a solution of the monomer and also a solution of initiator (2) into the reaction vessel immediately after the introduction of initiator [1].
5. After all that monomer and initiator have been introduced continued stir the contents of the reaction vessel for a further 30 minutes maintaining a temperature of 80° C.

Synthesis of an Acrylamide:Glycidyl Methacrylate Polymer (99:1 mole ratio)

| Vessel: | Water | 350.0 g |
| | (DETAPA) @6% | 0.5 mls |
| | (acetic acid to ~pH 5) | |
| Initiator (1) | Ammonium persulphate | 0.431 g in 10 mls water |
| Monomer: | Acrylamide @50% | 396.0 g |
| | Glycidyl methacrylate @97% | 4.13 g |
| | Water | 199.87 g |
| Initiator (2) (2.25 hour feed): | Ammonium persulphate | 0.569 g in 50 mls of water |

3. Reaction of the Polymer with CBD

Reaction of a Polyacrylamide-Glycidylmethacrylate (99.99:0.01 mol ratio) Copolymer with CBD Cellulose binding domain (obtained from Clostridium cellulovorans) (0.0112 parts) is dissolved in deionised water (1.6736 parts) and added to 1.2827 parts of a copolymer solution of polyacrylamide-glycidylmethacrylate (99.99:0.01 mol ratio, Molecular weight average (Mw) of 111,000), which contained 0.0186 parts polymer. The mixture is heated to 60° C. for 1 hour and size exclusion chromatography (SEC) analysis shows that both the profiles of the CBD and those of the base polymer have changed.

The diagram (FIG. 1) shows the molecular weight distribution of the unreacted CBD (plot 1), the unreacted polymer (plot 2), and the CBD-polymer post reacted material (plot 3) as analysed using the 210 nm UV detector. It can be seen that a shifting of the molecular weight distribution to higher molecular weights in the post-reacted sample has occurred. This plot also shows the CBD-polymer post reacted material (plot 4) using a 280 nm UV detector system; because only the CBD material contains chromophores that absorb at 280 nm, then this is highly indicative that the post reacted CBD-polymer material contains CBD.

4. Preparation of Paper Handsheets using Polymer Reacted CBD

Stock Preparation

A 50:50 long:short fibre stock is prepared with 10% filler at a consistency of 1.8% and beaten to a Freeness of 45SR.

Polymer Evaluation—Tensile Strength

The stock is stirred at 1000 rpm and the reacted CBD polymer (or CBD) (0.1%) is added at 1 kg/t with mixing for 30 seconds.

The stock is then diluted to 0.5% and 5×300 ml aliquots taken.

Each aliquot is dosed with Percol 182 cationic polyacrylamide of intrinsic viscosity above 7 dl/g (500 g/t) with stirring at 1500 rpm for 30 seconds, before addition of Hydrocol O sodium bentonite (2 kg/t) with further mixing at 500 rpm for 15 seconds. Handsheets are then produced using a British Standard Handsheet maker and 5 handsheets are produced per sample. Each handsheet has a strip (2.5 cm width) cut from it and the individual strips conditioned in accordance with Tappi test method T402 (Standard conditioning and testing atmospheres for paper, board, pulp handsheets and related products).

The conditioned strips are then tested in accordance with Tappi test method T494 (Tensile breaking properties of paper and paperboard) using a Testometric 220D.

Polymers Evaluated

The polymers that are used were polyacrylamide-glycidylmethacrylate copolymers with varying degrees of the reactive glycidylmethacrylate units as shown in the following table:

| No | Mole % of glycydylmethacrylate units | % Initiator used on monomer | Mw | Dry Weight (%) |
|---|---|---|---|---|
| 2 | 1 | 0.75 | 279000 | 22.9 |
| 3 | 1 | 1 | 197000 | 23.5 |
| 4 | 0.1 | 0.5 | 253000 | 24.0 |
| 5 | 0.1 | 0.75 | 216000 | 23.5 |
| 6 | 0.1 | 1 | 148000 | 23.1 |
| 7 | 0.01 | 0.5 | 140000 | 22.0 |
| 8 | 0.01 | 0.75 | 111000 | 22.8 |
| 9 | 0.01 | 1 | 155000 | 23.3 |

Results of Tensile Measurements;
CBD Polymer Reaction Mixtures;

| Sample No | Ash Weight (%) (Mean) | Tensile Index (Mean) |
|---|---|---|
| Blank (no polymer) | 10.49 | 46.34 |
| 2 | 9.89 | 53.89 |
| 3 | 9.96 | 53.04 |
| 4 | 10.10 | 57.24 |
| 5 | 9.98 | 55.47 |

-continued

| Sample No | Ash Weight (%) (Mean) | Tensile Index (Mean) |
|---|---|---|
| 6 | 9.82 | 55.35 |
| 7 | 9.86 | 54.63 |
| 8 | 9.98 | 55.05 |
| 9 | 10.23 | 57.44 |

CBD reacted polymers proved to be an effective dry strength resins. This shows that polyacrylamide-glycidyl-methacrylate copolymers when reacted with CBD can act as effective dry strength resins.

The invention claimed is:

1. A method of improving the strength of paper produced in a paper making process which process comprises providing a cellulosic suspension comprising cellulosic fibres and optionally fillers, including a dry strength resin, and then dewatering the cellulosic suspension on a wire or mesh to form a sheet and drying the sheet, in which the dry strength resin is a polymer comprising
   i) a synthetic polymeric component that has been formed from an ethylenically unsaturated water-soluble or potentially water-soluble monomer and an ethylenically unsaturated monomer carrying a reactive group, wherein the reactive group is directly reactive with a cellulose binding domain protein; and
   ii) a protein component comprising a cellulose binding domain protein, wherein the cellulose binding domain protein is covalently bonded to the synthetic polymer component through one or more of the reactive groups.

2. A method according to claim 1 in which the reactive group is selected from the group consisting of epoxides, isocyanates and amido methylol groups.

3. A method of improving the wet strength of paper produced in a paper making process which process comprises providing a cellulosic suspension comprising cellulosic fibres and optionally fillers, including a wet strength resin, and then dewatering the cellulosic suspension on a wire or mesh to form a sheet and drying the sheet, in which the wet strength resin is a polymer comprising
   i) a synthetic polymeric component that has been formed from an ethylenically unsaturated water-soluble or potentially water-soluble monomer and an ethylenically unsaturated monomer carrying a reactive group, wherein the reactive group is directly reactive with a cellulose binding domain protein; and
   ii) a protein component comprising a cellulose binding domain protein, wherein the cellulose binding domain protein is covalently bonded to the synthetic polymer component through one or more of the reactive groups.

4. A method according to claim 3 in which the reactive group is selected from the group consisting of epoxides, isocyanates and amido methylol groups.

5. A method of internally sizing paper produced in a paper making process which process comprises providing a cellulosic suspension comprising cellulosic fibres and optionally fillers, including internal sizing agent, and then dewatering the cellulosic suspension on a wire or mesh to form a sheet and drying the sheet, in which the internal sizing agent is a polymer comprising
   i) a synthetic polymeric component that has been formed from an ethylenically unsaturated water-soluble or potentially water-soluble monomer and an ethylenically unsaturated monomer carrying a reactive group, wherein the reactive group is directly reactive with a cellulose binding domain protein; and
   ii) a protein component comprising a cellulose binding domain protein, wherein the cellulose binding domain protein is covalently bonded to the synthetic polymer component through one or more of the reactive groups.

6. A method according to claim 5 in which the reactive group is selected from the group consisting of epoxides, isocyanates and amido methylol groups.

7. A method of surface sizing paper which method comprises applying a surface sizing agent to the surface of a formed cellulosic sheet, in which the surface sizing agent is a polymer comprising:
   i) a synthetic polymeric component that has been formed from an ethylenically unsaturated water-soluble or potentially water-soluble monomer and an ethylenically unsaturated monomer carrying a reactive group, wherein the reactive group is directly reactive with a cellulose binding domain protein; and
   ii) a protein component comprising a cellulose binding domain protein, wherein the cellulose binding domain protein is covalently bonded to the synthetic polymer component through one or more of the reactive groups.

8. A method according to claim 7 in which the reactive group is selected from the group consisting of epoxides, isocyanates and amido methylol groups.

* * * * *